Patented Oct. 28, 1952

2,615,891

UNITED STATES PATENT OFFICE 2,615,891

PTERIDINE PERBROMIDES AND METHOD OF PREPARING THE SAME

Angela A. Goldman, River Edge, N. J., and Coy W. Waller, Nanuet, N. Y., assignors to American Cyanamid Company, New York, N. Y., a corporation of Maine No Drawing. Application January 11, 1951, Serial No. 205,612

6 Claims. (Cl. 260—251.5)

1

This invention relates to new chemical compounds. More particularly, it relates to the perbromide of 2 - acylamino-4-hydroxy - 6 - methyl pteridines and method of preparing the same.

The new compounds of the present invention are believed to have the following formula:

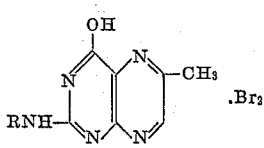

in which R is a carboxylic acid acyl radical.

The above products, like other pteridines, have no definite melting points. They have a distinct red color generally characteristic of perbromides. They are slightly soluble in water and practically insoluble in organic solvents.

The compounds of the present invention are prepared by reacting a 2-acylamino-4-hydroxy-6-methyl pteridine with bromine. The reaction is preferably carried out in a solvent, for example, glacial acetic acid.

The 2-acylamino-4-hydroxy-6-methyl pteridines used as intermediates in the present process are readily prepared by reacting 2-amino-4-hydroxy-6-methyl pteridine with an acyl halide or an aliphatic carboxylic acid anhydride. The compounds which can be reacted with 2-amino-4-hydroxy-6-methyl pteridine are compounds such as acetic anhydride, acetyl chloride, propionyl chloride, propionic acid anhydride, butyryl chloride, and the like.

The new process of the present invention is preferably carried out at a temperature of 60° C. to about 120° C. in the presence of photoflood lights which tend to activate the formation of the perbromide. The reaction can, however, be carried out without the use of photoflood lights. During the course of the reaction the product usually precipitates and can be separated by filtration.

The compounds of the present invention are useful as intermediates to be reacted with an aminobenzoic acid or amide thereof, which process is described and claimed in our copending application, Serial Number 205,611, filed January 11, 1951, which in turn may be hydrolyzed to produce folic acid and other related compounds having physiological activity.

In order that the nature of the process will be better understood the following examples are given by way of illustration. It will be understood that the conditions recited are merely representative and the process is not restricted to the exact details thereof.

*Example 1*

Ten grams of 2-amino-4-hydroxy-6-methylpterin is refluxed in one liter of acetic anhydride for about 4.5 hours and left standing at room temperature overnight. A fine crystalline precipitate separates from the solution along with some brown insoluble material. Therefore the whole mixture is again heated to reflux where the crystalline material goes into solution and the brown insoluble material is filtered from the hot solution. On cooling, fine orange needles are precipitated from the solution. These are filtered off, washed twice with water, acetone and ether. The yield of 2-acetyl-amino-4-hydroxy-6-methylpterin is 6.3 g. or 51%. The filtrate from this first crop of acetylated product, on standing, yields a second crop of material weighing 1.9 g. The first crop of acetylated material 6.3 g. is recrystallized five times from hot glacial acetic acid. Each recrystallization removes some coloration so that after five recrystallizations the 2-acetylamino-4-hydroxy-6-methylpteridine is almost white.

Forty-six grams of twice recrystallized 2-acetylamino - 4 - hydroxy - 6 - methylpteridine is dissolved in 1400 ml. of preheated (95° C.) glacial acetic acid. As soon as the pterin dissolves, 11.5 ml. of bromine is added all at once. The reaction is carried out under photoflood light and the temperature of the reaction mixture is maintained at 84° C. After the whole is stirred about 3–5 minutes, a deep red precipitate starts to separate from the solution. The reaction mixture is stirred under light for about 1.5 hours. At the end of this time the deep red precipitate is filtered off, washed with acetic acid and ether and dried. The yield of the perbromide of 2-acetylamino-4-hydroxy-6-methylpteridine is 53 g. or 66.5%.

*Example 2*

To 175 ml. of glacial acetic acid at steam bath temperature is added 5.43 g. (0.025 mols) of 2-acetylamino-4-hydroxy-6-methyl pteridine. Solution is complete at a temperature of about 87° C. The bromine, 1.28 ml. (0.025 mols) is added all at once with stirring. A flood light is turned on at close range so that the temperature gradually increased to 120° C. in 18 minutes. The product is collected by filtration, washed with acetic acid and ether, and dried. The perbromide of 2-acetylamino-4-hydroxy-6-methyl pteridine weighs 4.35 g.

Example 3

To 175 ml. of glacial acetic acid, at steam bath temperature, is added 5.43 g. of 2-acetylamino-4-hydroxy-6-methyl pteridine (temperature about 82° C.). With vigorous stirring 1.28 ml. of bromine is added. The stirred mixture is heated on a steam bath at 94° C. for 2 hours and 45 minutes. The product is collected, washed with ether and dried. It weights 5.2 g. and is identical with the product of Example 2.

We claim:

1. The perbromide of a 2-carboxylic acid acylamino-4-hydroxy-6-methyl pteridine.

2. The perbromide of 2-acetylamino-4-hydroxy-6-methyl pteridine.

3. A method which comprises heating a 2-carboxylic acid acylamino-4-hydroxy-6-methyl pteridine and bromine in a substantially anhydrous solvent whereby the perbromide of a 2-carboxylic acid acylamino-4-hydroxy-6-methyl pteridine is formed and recovering the said product.

4. A method which comprises heating a 2-carboxylic acid acylamino-4-hydroxy-6-methyl pteridine and bromine to a temperature within the range of 60° C. to about 120° C. in the presence of acetic acid and recovering the perbromide of a 2-carboxylic acid acylamino-4-hydroxy-6-methyl pteridine therefrom.

5. A method which comprises heating 2-acetylamino-4-hydroxy-6-methyl pteridine and bromine in a substantially anhydrous solvent and recovering the perbromide of 2-acetylamino-4-hydroxy-6-methyl pteridine therefrom.

6. A method which comprises heating in glacial acetic acid to a temperature within the range of 60° C. to about 120° C. 2-acetylamino-4-hydroxy-6-methyl pteridine and bromine and recovering therefrom the perbromide of 2-acetylamino-4-hydroxy-6-methyl pteridine.

ANGELA A. GOLDMAN.
COY W. WALLER.

REFERENCES CITED

The following references are of record in the file of this patent:

Richter: Textbook of Organic Chemistry, p. 476 (1938 edition).